(12) United States Patent
Lucas et al.

(10) Patent No.: US 7,555,939 B2
(45) Date of Patent: Jul. 7, 2009

(54) METHOD FOR THE MODULAR BALANCING OF A TURBOMACHINE ROTOR

(75) Inventors: Paul Lucas, Lorient (FR); Alain Luinaud, Livry sur Seine (FR)

(73) Assignee: Snecma, Paris (FR)

( * ) Notice: Subject to any disclaimer, the term of this patent is extended or adjusted under 35 U.S.C. 154(b) by 0 days.

(21) Appl. No.: 12/019,076

(22) Filed: Jan. 24, 2008

(65) Prior Publication Data

US 2008/0245138 A1   Oct. 9, 2008

(30) Foreign Application Priority Data

Jan. 29, 2007   (FR)   ................................. 07 00595

(51) Int. Cl.
*G01M 1/00*   (2006.01)
(52) U.S. Cl. ................................. 73/66; 73/457; 73/468
(58) Field of Classification Search ...................... 73/66, 73/457, 458, 468, 473; 310/261
See application file for complete search history.

(56) References Cited

U.S. PATENT DOCUMENTS

| | | | | |
|---|---|---|---|---|
| 3,812,724 A | * | 5/1974 | Curtz et al. | 73/458 |
| 4,432,253 A | * | 2/1984 | Kerlin | 322/40 |
| 4,586,225 A | * | 5/1986 | Bouiller et al. | 29/889.2 |
| 5,125,188 A | * | 6/1992 | Ogawa et al. | 451/5 |
| 5,429,422 A | * | 7/1995 | Baldi | 301/65 |
| 5,450,337 A | * | 9/1995 | Chuan-Yuan et al. | 700/279 |
| 5,461,791 A | * | 10/1995 | Piety | 33/1 N |
| 5,811,678 A | * | 9/1998 | Hirano | 73/461 |
| 6,189,371 B1 | * | 2/2001 | Hirano | 73/66 |
| 6,341,419 B1 | * | 1/2002 | Forrester et al. | 29/889.2 |
| 6,676,317 B2 | * | 1/2004 | Ozaki | 400/636.3 |
| 6,779,391 B2 | * | 8/2004 | Bosl | 73/146 |
| 2003/0150260 A1 | * | 8/2003 | Bosl | 73/146 |
| 2004/0003678 A1 | * | 1/2004 | Neubauer et al. | 74/573 R |
| 2005/0005686 A1 | * | 1/2005 | Oppermann et al. | 73/66 |

FOREIGN PATENT DOCUMENTS

| | | | |
|---|---|---|---|
| DE | 2615716 A | * | 10/1976 |
| DE | 3733144 A | * | 4/1989 |
| JP | 2004297882 A | * | 10/2004 |

* cited by examiner

*Primary Examiner*—Hezron Williams
*Assistant Examiner*—Samir M Shah
(74) *Attorney, Agent, or Firm*—Oblon, Spivak, McClelland, Maier & Neustadt, P.C.

(57) ABSTRACT

A method of balancing a first turbomachine module (20), including along an axis of rotation a bearing plane (22) on one side and a junction plane (24) on the other, with respect to a rotor (1) including said module (20), in which
an equivalent complementary module is defined such that the two modules form a rotor equivalent to said rotor by assembling along the junction plane (24),
the total unbalance of said equivalent rotor and the corresponding correction to be made to said module are determined,
which method includes the following steps:
the concentricity deviation of the bearing (22) of the first module (20) with respect to the axis perpendicular to the junction plane (24) is determined; the theoretical geometric unbalance of said equivalent complementary module is calculated;
a short journal (40) is mounted on the first module adjacent to the junction plane (24) to form a short rotor whose axis of rotation is substantially coincident with the axis of the module (20) and the unbalance of the short rotor is measured; and
the total unbalance of said module is determined by adding to the unbalance of the short rotor a systematic unbalance corresponding to the geometric unbalance.

2 Claims, 2 Drawing Sheets

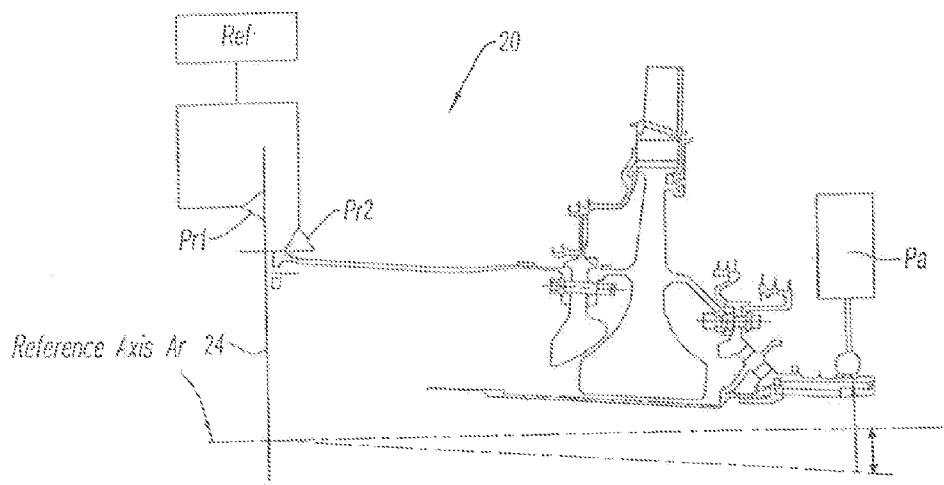
Fig. 3
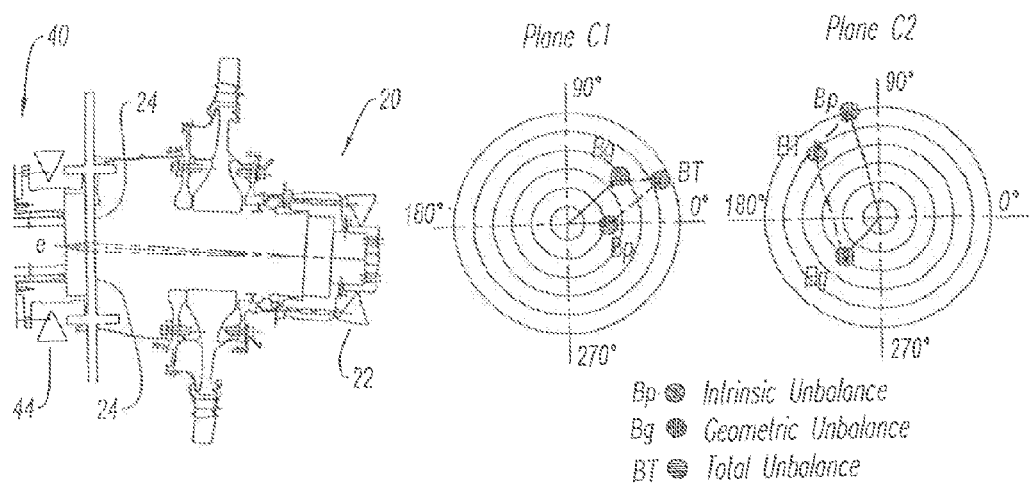
Fig. 4
Fig. 5
Bp ● Intrinsic Unbalance
Bg ● Geometric Unbalance
BT ● Total Unbalance

METHOD FOR THE MODULAR BALANCING OF A TURBOMACHINE ROTOR

BACKGROUND OF THE INVENTION AND DESCRIPTION OF THE PRIOR ART

The present invention relates to the field of turbomachines and to gas turbine engines in particular.

A turbomachine comprises rotors which generally consist of a plurality of elements which are manufactured separately and assembled mechanically. A gas turbine engine thus comprises one or more rotor assemblies each consisting of a compressor and of a turbine. To ensure a certain degree of flexibility as regards the maintenance of the engines, the assemblies are made up of interchangeable modules. In the case of a gas turbine engine rotor, a compressor module is combined with a turbine module. In the context of a repair, for example, it is thus possible to replace the compressor or turbine module of the rotor with another module.

This modular structure of the turbomachines entails a prior balancing of each module. This is because it is desirable not to have to rebalance the complete rotor following the substitution of one module by another.

A method for the modular balancing of a rotor has thus been conceived that allows the standard changing of the components balanced using this method without having to rebalance the rotor.

This method for a gas turbine engine rotor consisting of a compressor module and of a turbine module thus involves separately balancing the modules when they are assembled with equivalent complementary or substitution turbine or compressor modules. The equivalent complementary modules, also termed substitution masses, represent, by virtue of their length, their mass and the position of their center of gravity, the complementary part, in the rotor, of the component to be balanced. Such an assembly is mounted on a balancing machine which makes it possible to determine the unbalance thereof and which provides indications on the correction to be made in the correction planes of the module, that is to say the mass and its position in the plane: radius and angle.

With this method the two modules are balanced as if they were assembled to perfect complementary modules. However, it appears that errors in contacting the modules, the equivalent complementary modules and the tooling distort the balancing. These errors are due to the perpendicularity deviation of the junction face of the module to be balanced with respect to its axis of rotation.

When balancing the module together with the equivalent complementary module, it is possible to discriminate a number of unbalances. As demonstrated by a balancing machine, the total unbalance can be broken down according to the following vector sum:

$$Bt = Bp + Bg + Bo + Ba$$

Bt is the total unbalance of the rotor composed of the assembly formed by the module and the equivalent complementary module. Its characteristics are provided by the balancing machine.

Bp is the intrinsic unbalance of the rotor to be balanced resulting from the nonhomogeneity of the materials, from the error in mounting the components which constitute it, and from the distribution of the blades as well. This unbalance is fixed but unknown. It is sought to correct it.

Bg is the geometric unbalance. It is produced by the perpendicularity deviation of the junction face of the module to be balanced with respect to its axis of rotation, which is demonstrated by the substitution module. This unbalance is fixed. It is known from the geometric characterization that is performed systematically for the mounting of the module. It is sought to correct it.

Bo is the unbalance of the tooling, that is to say all the unbalances produced by the errors in the equivalent module, the rotating tooling and also the drive mechanism. These unbalances are cancelled by the operation of inverting the tooling. It will be recalled that this operation involves carrying out a first unbalance measurement at 0° with respect to the reference plane passing through the axis, and a second measurement of the assembly mounted on the tooling by inverting it at 180° with respect to the reference plane.

Ba is the contacting unbalance of the complementary module. It is produced by the eccentricity caused by the error in contacting the complementary module with the module to be balanced. It is variable and unknown. Its amplitude must be determined so as to know what effect it has on the balancing of the rotor as a whole. It is a disruptive unbalance which introduces an error during the modular balancing with a complementary module or substitution mass. More specifically, this error is variable from one mounting operation to another, is not known and cannot be corrected by the inversion operation with respect to the tooling. The nonrepeatability of this type of error can be explained by the variation in the conditions from one mounting operation to another, for example the temperature can vary, and the clamping and positioning can also vary. This unbalance is therefore a disruptive unbalance which it is necessary to keep below a minimum value so that the modular balancing method gives results which can be used. In particular, although the eccentricity resulting from this error is of the same degree as the eccentricity resulting from the geometric error in the junction face of the module, the latter can be minimized or increased without it being possible to anticipate it. Such an error is therefore liable to produce an excess or error value, depending on the circumstances of the mounting operation, of the correcting unbalance applied with the modular balancing method.

In summary, the contacting error is nonpredictable and nonrepeatable. It disrupts the modular balancing and distorts the results.

SUMMARY OF THE INVENTION

The objective of the present invention is therefore to find an improved modular balancing method in which the harmful effects of the contacting errors in the complementary modules and the tooling are eliminated.

According to the invention, a solution to this problem is provided. The method according to the invention of balancing a first turbomachine module, comprising along an axis of rotation a bearing plane on one side and a junction plane on the other, with respect to a rotor comprising said module, in which an equivalent complementary module is defined such that the two modules form a rotor equivalent to said rotor by assembling along the junction plane, the total unbalance of said equivalent rotor and the corresponding correction to be made to said module are determined, is characterized in that it comprises the following steps:

the concentricity deviation of the bearing of the first module with respect to the axis perpendicular to the junction plane is determined;

the theoretical geometric unbalance produced by said equivalent complementary module and resulting from said concentricity deviation is calculated;

a short journal is mounted on the first module adjacent to the junction plane to form a short rotor whose axis of rotation is substantially coincident with the axis of the module, and the unbalance of the short rotor is measured; and the unbalance of said module is determined by adding to the unbalance of the rotor a systematic unbalance corresponding to said theoretical geometric unbalance.

More particularly, the length of the short journal is determined such that the axis of the short rotor is off-centered with respect to the axis of the module by a value which can vary as a function of the rotor and of the balancing tolerance.

Thus, the invention is based on replacing the actual complementary module with a calculated theoretical complementary module whose characteristics are introduced in order to determine the unbalance to be corrected. By this means account is taken, when balancing the module, of the influence of a perfect complementary module mounted without contacting error.

For example, this method makes it possible, during each inversion operation with respect to the tooling, to avoid accumulation of the errors introduced by the contacting errors of type Ba referred to above.

Although aimed more particularly at gas turbine engine rotors, the invention applies to any type of balancing and for any rotor part that it is sought to make modular.

The solution of the invention additionally offers the following advantages.

It allows a precise modular balancing to be achieved. Its precision depends only on the precision of the balancing machine used and on the concentricity measurements carried out.

It makes it possible to carry out the balancing operations with a time saving with respect to the modular balancing method of the prior art. This time saving is associated with:

the reaction of the rotor to the masses applied during the correction operation. With an actual complementary module there is a high degree of instability resulting from a poor plane separation. With a short journal by contrast, the rotor remains stable and the correction made in one correction plane has little influence in the other plane. That results from a good plane separation;

the accessibility of the correction plane across the short journal. Owing to the small length of the short journal with respect to that of a complementary module, the accessibility is improved;

the contacting precision for a short journal is less constraining than with a complementary module.

It will be possible moreover to eliminate the tooling inversion operation with a balancing machine provided with lightweight and balanced short tooling.

The method, using short journals which are less demanding in terms of machining precision, is more cost-effective than the conventional method.

BRIEF DESCRIPTION OF THE DRAWINGS

The invention will now be described in more detail below with reference to the appended drawings, in which FIG. 1 schematically represents a gas turbine engine rotor with its two modules;

FIG. 3 shows the principle of measuring the eccentricity on a module;

FIG. 4 shows a turbine module on which a short journal has been mounted;

FIG. 5 represents a diagram showing the total unbalance to be corrected on two correction planes C1 and C2.

DESCRIPTION OF THE PREFERRED EMBODIMENTS

Figure 1:
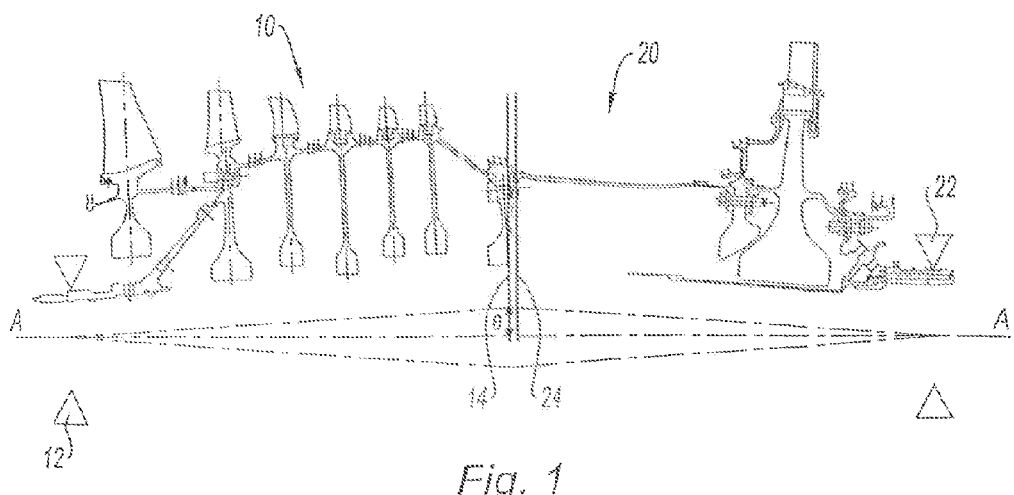

FIG. 1 shows a gas turbine engine rotor. For example, the rotor here is a high-pressure rotor of a two-spool engine. The rotor 1 is composed of a first module and of a second module. The first module here is the compressor 10 and the second module is the turbine 20. They each comprise a support journal for a respective bearing 12 and 22 and a junction plane, 14 and 24. The rotor turns about its axis of rotation AA passing through the bearings 12 and 22. Each of the modules is obtained by stacking unit components. Owing to the manufacturing tolerances, the junction planes 14 and 24 via which the two modules are assembled and bolted are not perfectly perpendicular to their own axis of rotation. This results in an eccentricity e, which is exaggerated in the figure, during the mounting operation.

Figure 2:
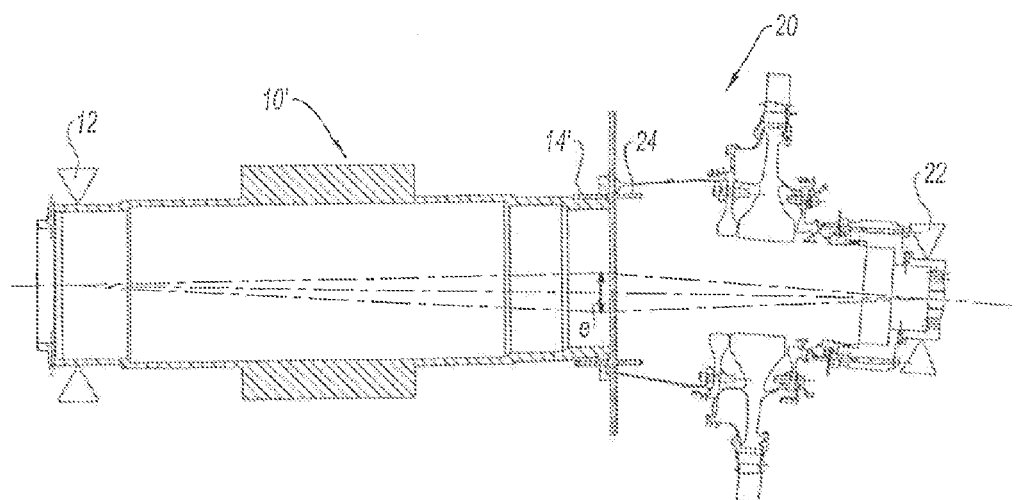
FIG. 2 schematically represents the mounting of an equivalent complementary module on a turbine module for the purpose of modular balancing.

FIG. 2 shows a mounting operation for balancing the turbine module 20. The module 20 comprises, on one side, the journal forming a support for the bearing 22 and, on the other, a junction face 24 with means for fastening to the equivalent complementary compressor module. On the turbine module 20 has been mounted an equivalent compressor module 10' by fastening it at one end 14' to the junction face 24 of the turbine module 20. This module 10' comprises a journal at its other end for the mounting of a bearing 12'. This equivalent complementary module 10', in this case a compressor module, is mechanically substituted for the compressor of the rotor in terms of dynamic behavior for the purpose of balancing. Thus, its length is defined such that the distance between the two bearings 12' and 22 is that of the engine. Its mass and its center of gravity are the same as those of the compressor 10. The mounting is assumed to be perfect.

For the operation of balancing the module 20, this assembly is placed in a balancing machine, known per se. The total unbalance measured corresponds to the intrinsic unbalance of the module plus its geometric unbalance due to the perpendicularity deviation and to the tooling unbalance. The latter is eliminated by the inversion operation.

The figure shows an error-free mounting. However, as explained above, according to the circumstances of the mounting there is added to the geometric unbalance a so-called contacting unbalance which it is not possible to control and which either minimizes or exaggerates the unbalance.

To overcome this problem according to the invention, a theoretical geometric unbalance is calculated and the unbalance is determined by taking it into account.

To this end, the eccentricity resulting from the perpendicularity deviation of the junction plane is determined.

FIG. 3 shows a way of measuring this eccentricity on a turbine module 20.

Two reference planes Pr1 and Pr2 with respect to the junction plane 24 of the module 20 and also a reference axis Ar perpendicular to the plane 24 are defined. A sensor Pa of a three-dimensional measuring machine measures the position of the support journal for the bearing 22. This provides the measurement of the distance of the axis of the journal from the reference axis. In order to measure this eccentricity, use can be made for example of the method developed under the name of Genspect by General Electric.

Knowing the value of the eccentricity, the geometric unbalance of the substitution mass or equivalent complementary module is determined from the knowledge of its center of gravity and its mass. The unbalance is expressed in cm.g.

The component unbalance is determined in the following way.

Instead of an actual complementary module, a simple short journal is placed on the module to be balanced. FIG. 4 shows the mounting of such a short journal 40 on a turbine module 20. It comprises a junction face 44 for mounting on the junction face 24 of the module, and it has a cylindrical surface forming a support for a bearing 42. As can be seen from FIG. 4, the axis between the two bearings 42 and 22 is virtually coincident with the axis of the module. The eccentricity measured at the junction plane between the two axes is variable as a function of the rotor type and the balancing tolerance.

The objective aimed for by mounting this short journal is to eliminate the influence of the geometric error. The unbalance measured corresponds to the component unbalance Bp as referred to in the preamble of the present application.

The total unbalance of the turbine module 20 is obtained by the vector sum $$Bt=Bp+Bg$$

In a turbomachine rotor there are generally two correction planes for each module.

The diagram of FIG. 5 shows the total unbalance to be corrected on the two correction planes C1 and C2.

The invention claimed is:

1. A method of balancing a first turbomachine module, comprising along an axis of rotation a bearing plane on one side and a junction plane on the other, with respect to a rotor comprising said module, in which an equivalent complementary module is defined such that the two modules form a rotor equivalent to said rotor by assembling along the junction plane, the total unbalance of said equivalent rotor and the corresponding correction to be made to said module are determined, which method comprises the following steps:

the concentricity deviation of the bearing of the first module with respect to the axis perpendicular to the junction plane is determined;

the theoretical geometric unbalance of said equivalent complementary module is calculated;

a short journal is mounted on the first module adjacent to the junction plane to form a short rotor whose axis of rotation is substantially coincident with the axis of the module, and the unbalance of the short rotor is measured; and the total unbalance of said module is determined by adding to the unbalance of the short rotor a systematic unbalance corresponding to the geometric unbalance.

2. The method as claimed in the preceding claim 1, in which, with the rotor being a gas turbine engine rotor, the compressor module and the turbine module are balanced separately.

* * * * *